US012037119B2

(12) United States Patent
Murayama (10) Patent No.: US 12,037,119 B2
(45) Date of Patent: Jul. 16, 2024

(54) AIRCRAFT WATER SUPPLY SYSTEM (71) Applicant: The Yokohama Rubber Co., LTD., Tokyo (JP)

(72) Inventor: Hiroshi Murayama, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 571 days.

(21) Appl. No.: 17/275,879

(22) PCT Filed: Sep. 13, 2019

(86) PCT No.: PCT/JP2019/036103
§ 371 (c)(1),
(2) Date: Mar. 12, 2021

(87) PCT Pub. No.: WO2020/059659
PCT Pub. Date: Mar. 26, 2020

(65) Prior Publication Data
US 2022/0055753 A1 Feb. 24, 2022

(30) Foreign Application Priority Data

Sep. 18, 2018 (JP) ................................. 2018-173755

(51) Int. Cl.
*B64D 11/04* (2006.01)
*B64D 11/02* (2006.01)
(Continued)

(52) U.S. Cl.
CPC .............. *B64D 11/04* (2013.01); *B64D 11/02* (2013.01); *F24D 19/1051* (2013.01);
(Continued)

(58) Field of Classification Search
CPC ..... B64D 11/04; B64D 11/02; F24D 19/1051; G05D 23/1393; G05D 23/1333;
(Continued)

(56) References Cited

U.S. PATENT DOCUMENTS 3,952,796 A * 4/1976 Larson .................... F24F 11/83
236/1 C
11,459,106 B2 * 10/2022 Murayama ......... G05D 23/1393
(Continued)

FOREIGN PATENT DOCUMENTS

EP 2045687 A2 4/2009
EP 2937286 A1 10/2015
(Continued)

*Primary Examiner* — Rodney A Bonnette
(74) *Attorney, Agent, or Firm* — Thorpe North & Western (57) ABSTRACT An aircraft water supply system supplies water to a water discharge port in an aircraft. A cold water flow path supplies cold water to the water discharge port. A hot water flow path supplies hot water to the water discharge port. A first control valve adjusts the flow rate of cold water flowing through the cold water flow path. A second control valve adjusts the flow rate of hot water flowing through the hot water flow path. A temperature sensor detects the water temperature at any point up to the water discharge port. A flow control unit controls the opening/closing state of the first control valve and the second control valve based on the water temperature detected by the temperature sensor.

9 Claims, 5 Drawing Sheets (51) Int. Cl.
*F24D 19/10* (2006.01)
*F24H 15/174* (2022.01)
*F24H 15/212* (2022.01)
*F24H 15/219* (2022.01)
*F24H 15/238* (2022.01)
*F24H 15/281* (2022.01)
*F24H 15/31* (2022.01)
*G05D 23/13* (2006.01)

(52) U.S. Cl.
CPC ......... *F24H 15/174* (2022.01); *F24H 15/212* (2022.01); *F24H 15/219* (2022.01); *F24H 15/238* (2022.01); *F24H 15/281* (2022.01); *F24H 15/31* (2022.01); *G05D 23/1393* (2013.01)

(58) Field of Classification Search
CPC .............. G05D 23/134; G05D 23/1373; F24H 15/174; F24H 15/31; F24H 15/212; F24H 15/219; F24H 15/238; F24H 15/281
See application file for complete search history.

(56) References Cited

U.S. PATENT DOCUMENTS

| | | |
|---|---|---|
| 2007/0001018 A1 | 1/2007 | Schmitt |
| 2007/0005190 A1* | 1/2007 | Feinleib ............... F24H 15/355 |
| | | 700/275 |
| 2009/0083906 A1 | 4/2009 | Kurita |
| 2010/0235978 A1 | 9/2010 | Guttau et al. |

FOREIGN PATENT DOCUMENTS

| | | |
|---|---|---|
| JP | 7-28529 A | 1/1995 |
| JP | 7-129253 A | 5/1995 |
| JP | 2003-311135 A | 11/2003 |
| JP | 4457139 B2 | 4/2010 |
| KR | 10-2006-0120544 | 11/2006 |

* cited by examiner

AIRCRAFT WATER SUPPLY SYSTEM

TECHNICAL FIELD

The present technology relates to an aircraft water supply system for supplying water to a water discharge port in an aircraft.

BACKGROUND ART

In the related art, two lines, one for cold water and the other for hot water, are connected to a water discharge port provided in a lavatory or the like in an aircraft, and it is possible to switch the temperature or adjust the temperature to an intermediate temperature according to the user's preference.

As a method for adjusting the temperature to an intermediate temperature, a manual (dial) type has been adopted in the old model, and a button-based multi-stage (for example, 5-step) switching method and the like have been adopted recently.

Most of the button-based multi-step methods are electronically controlled, and for example, a method of changing the actual flow rate ratio by changing the duty ratio of a solenoid valve (ON-OFF valve) between hot water and cold water has been proposed.

For example, in Japan Patent No. 4457139, a mixing means is provided with a first solenoid valve and a second solenoid valve individually connected to a cold water inlet port and a hot water inlet port, a control signal reflecting the temperature specified by a temperature adjusting means is transmitted to the mixing means via a control wire, and a duty ratio of each of the first solenoid valve and the second solenoid valve is changed based on the specified temperature, whereby the water temperature of the mixed water is adjusted.

However, temperature of both cold water and hot water is not constant due to environmental factors within aircrafts (for example, flight altitude (outside air temperature), heater performance for hot water, continuous hot water usage, and the like). Thus, even if cold water and hot water are mixed by controlling the electromagnetic valve according to the conventional method, the temperature of the water supplied to a water discharge port will not be constant. In other words, even when the temperature is set by a user, the relative water temperature can be adjusted, but there is a problem that it is difficult to supply water at a certain temperature.

SUMMARY

The present technology enables water to be used in an aircraft to be supplied at a desired temperature.

The present technology provides an aircraft water supply system for supplying water to a water discharge port in an aircraft, the system including: a cold water flow path that supplies cold water to the water discharge port; a hot water flow path that supplies hot water to the water discharge port; a first control valve that adjusts a flow rate of the cold water flowing through the cold water flow path; a second control valve that adjusts a flow rate of the hot water flowing through the hot water flow path; a temperature sensor that detects a water temperature at any point up to the water discharge port; and a flow control unit that controls an opening/closing state of the first control valve and the second control valve based on the water temperature detected by the temperature sensor.

According to the present technology, since the flow rate of cold water and hot water (the opening/closing state of the first control valve and the second control valve) is controlled based on the water temperature detected by the temperature sensor, which is advantageous in controlling the temperature of the water to be discharged from the water discharge port with high accuracy as compared with a case where the temperature sensor is not used.

DETAILED DESCRIPTION

First Embodiment

Aircraft water supply systems according to preferred embodiments of the present technology are described in detail below with reference to the accompanying drawings.

Figure 1:
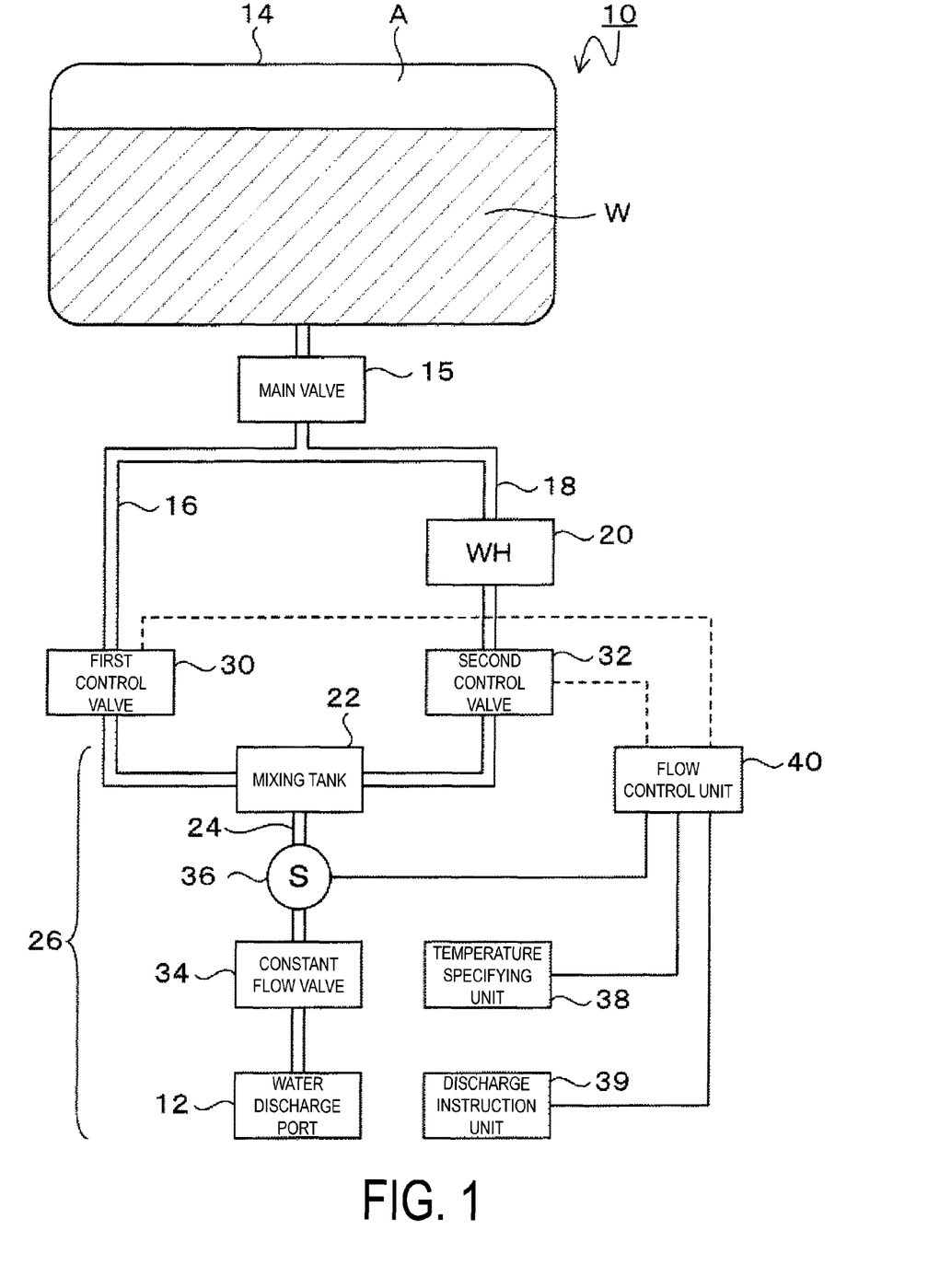
FIG. 1 is a diagram illustrating a configuration of an aircraft water supply system 10 according to a first embodiment.

FIG. 1 is a diagram illustrating a configuration of an aircraft water supply system 10 according to a first embodiment.

The aircraft water supply system 10 supplies water to a water discharge port 12 in an aircraft. The water discharge port 12 is installed in a lavatory, a galley, or the like in an aircraft, for example, and provides users with water for hand washing or drinking.

In the present embodiment, it is assumed that the water discharge port 12 is installed in a lavatory inside an aircraft. A hand wash faucet (the water discharge port 12 in the present embodiment) in a lavatory is used by an unspecified number of boarding passengers, and there are various demands for water temperature as compared with a faucet such as a galley used by a limited number of users.

The discharge of the water from the water discharge port 12 is switched on/off by operating a discharge instruction unit 39. The discharge instruction unit 39 is a mechanism such as a sensor, a cock, a switch, or the like provided in the vicinity of the water discharge port 12. For example, the discharge instruction unit 39 may be configured as an automatic faucet such that an infrared sensor is used as the discharge instruction unit 39, a user's hand is detected by the infrared sensor, and water is discharged when the user's hand is held over. Alternatively, the discharge instruction unit 39 may be configured as a manual faucet such that a cock or a switch is used as the discharge instruction unit 39 and water is discharged for a predetermined period in response to the user operating the cock or the switch.

The temperature specifying unit 38 is disposed near the water discharge port 12, for example, and a user can specify the temperature of the water to be discharged from the water discharge port 12. The temperature specifying unit 38 may employ a button-based multi-stage switching system, a dial-based continuous switching system, or the like.

Note that the temperature specifying unit 38 may not be provided, and the water temperature may be maintained at a predetermined set temperature (fixed value).

The water supplied to the water discharge port 12 is stored in a water tank 14 installed in an aircraft. In addition to the water W, the compressed air A is supplied to the water tank 14, and the water W is extruded toward the water discharge port 12 by the pressure from the compressed air A. The temperature of the water W inside the water tank 14 varies depending on the temperature and the like around the tank.

The water flow path from the water tank 14 to the water discharge port 12 includes a cold water flow path 16, a hot water flow path 18, and a mixing flow path 24. In the present embodiment, a main valve (a shutoff valve) 15 is first provided downstream from the water tank 14. The main valve 15 is a valve for disconnecting the water tank 14 and the flow paths in the event of abnormalities. The cold water flow path 16 and the hot water flow path 18 are branched downstream from the main valve 15.

Note that the cold water flow path 16 and the hot water flow path 18 may be connected directly to the water tank 14. In this case, main faucets (a cold water faucet and a hot water faucet) may be provided at positions near the water tank 14 of the cold water flow path 16 and the hot water flow path 18, respectively.

The cold water flow path 16 is a flow path for supplying cold water to the water discharge port 12, and is a flow path through which the water W in the water tank 14 flows as it is (without being heated). In the present embodiment, the cold water flow path 16 connects the water tank 14 and the mixing tank 22.

The hot water flow path 18 is a flow path for supplying hot water to the water discharge port 12. In the present embodiment, the hot water flow path 18 connects the water tank 14 and the mixing tank 22. A water heater (WH) 20 is provided in the hot water flow path 18. A heating material is provided in the water heater 20, and water flowing through the hot water flow path 18 is heated by the water heater 20 to become hot water, and the hot water is supplied to the water discharge port 12. The temperature of the hot water heated by the water heater 20 varies depending on factors, for example, such as the temperature of the water W in the water tank 14, the heating performance of the water heater 20, the amount of continuous hot water used (the higher the continuous hot water usage, the lower the heating performance).

In the mixing tank 22, the cold water flowing through the cold water flow path 16 and the hot water flowing through the hot water flow path 18 are mixed.

The mixing flow path 24 connects the mixing tank 22 and the water discharge port 12, and the mixed water of cold water and hot water mixed in the mixing tank 22 flows through the mixing flow path 24.

In the present embodiment, the components ranging from the mixing tank 22 to the mixing flow path 24 form a mixing supply unit 26. The mixing supply unit 26 mixes cold water and hot water downstream from the first control valve 30 and the second control valve 32, which will be described later, and supplies the mixed water to the water discharge port 12.

The mixing flow path 24 is provided with a constant flow valve 34 that makes the amount of water supplied to the water discharge port 12 constant. As a result, the amount of the water discharged from the water discharge port 12 becomes constant. The constant flow valve 34 maintains the amount of water supplied to the downstream side to be constant by widening the water channel when the water pressure on the upstream side is low and narrowing the water channel when the water pressure on the upstream side is high.

In this case, the temperature sensor 36 detects the water temperature at any point from the water tank 14 to the water discharge port 12. In the first embodiment, the temperature sensor 36 is provided in the mixing supply unit 26 to detect the water temperature in a state in which cold water flowing through the cold water flow path 16 and hot water flowing in the hot water flow path 18 are mixed. In FIG. 1, the temperature sensor 36 is provided downstream from the mixing tank 22 and on the mixing flow path 24 upstream from the constant flow valve 34, but the temperature sensor 36 may be provided, for example, in the mixing tank 22, or downstream from the constant flow valve 34.

The detection value of the temperature sensor 36 is output to the flow control unit 40, which will be described later.

The cold water flow path 16 and the hot water flow path 18 are each provided with a control valve for adjusting the flow rate of water flowing through each of the flow paths.

That is, a first control valve 30 that adjusts the flow rate of cold water flowing through the cold water flow path 16 and a second control valve 32 that adjusts the flow rate of hot water flowing through the hot water flow path 18 are provided.

The first control valve 30 and the second control valve 32 are, for example, solenoid valves, and in the present embodiment, are proportional control valves of which the degree of valve opening depends on an input current value.

The type of the valves used as the first control valve 30 and the second control valve 32 are not particularly limited as long as the flow rate of water flowing through each of the flow paths can be adjusted. When a proportional control valve is used, the degree of valve opening can be adjusted arbitrarily (continuously), and the flow rate in each of the flow paths can be adjusted with higher accuracy.

As another example of the valves used as the first control valve 30 and the second control valve 32, an ON-OFF valve of which the opening time (or closing time) per unit time can be adjusted by changing the duty ratio can be used.

The flow control unit 40 (controller) controls the opening/closing state of the first control valve 30 and the second control valve 32 based on the water temperature detected by the temperature sensor 36. In the present embodiment, the temperature sensor 36 is provided in the mixing supply unit 26. In this case, the flow control unit 40 controls the opening/closing state of the first control valve 30 and the second control valve 32 based on the water temperature in the mixing supply unit 26.

The flow control unit 40 controls the opening/closing state of the first control valve 30 and the second control valve 32 based on the temperature specified by the temperature specifying unit 38. In other words, the opening/closing state of each of the control valves 30 and 32 is controlled so that the temperature of the water discharged from the water discharge port 12 reaches the temperature specified by the temperature specifying unit 38 (hereinafter referred to as the "specified water temperature").

Note that when the temperature specifying unit 38 is not provided, the opening/closing state of the first control valve 30 and the second control valve 32 is controlled based on a predetermined set temperature (fixed value). In other words, the opening/closing state of each of the control valves 30 and 32 is controlled so that the temperature of the water discharged from the water discharge port 12 reaches a set temperature.

In the present embodiment, since the temperature sensor 36 is provided in the mixing supply unit 26, the detection value of the temperature sensor 36 is approximately equal to the temperature of the water discharged from the water discharge port 12. Thus, for example, when the detection value of the temperature sensor 36 is higher than the specified water temperature, the flow control unit 40 controls the first control valve 30 (the cold water side) to the opening direction and controls the second control valve 32 (the hot water side) to the closing direction so that the amount of the cold water flowing toward the mixing tank 22 is increased and the amount of the hot water flowing toward the mixing tank 22 is decreased. Further, for example, when the detection value of the temperature sensor 36 is lower than the specified water temperature, the flow control unit 40 controls the first control valve 30 (the cold water side) to the closing direction and controls the second control valve 32 (the hot water side) to the opening direction so that the amount of the cold water flowing toward the mixing tank 22 is decreased and the amount of the hot water flowing toward the mixing tank 22 is increased.

Note that the flow control unit 40 may adjust any one of the first control valve 30 and the second control valve 32 (the hot water side). For example, when the detection value of the temperature sensor 36 is higher than the specified water temperature, the first control valve 30 (the cold water side) may be controlled to the opening direction without changing the degree of opening of the second control valve 32 (the hot water side), and the second control valve 32 (the hot water side) may be controlled to the closing direction without changing the degree of opening of the first control valve 30 (the cold water side).

On the other hand, when only one of the first control valve 30 and the second control valve 32 is adjusted, there is a possibility that the amount of water supplied to the mixing supply unit 26 fluctuates. Thus, the flow control unit 40 may control the opening/closing state of the first control valve 30 and the second control valve 32 so that the sum of the flow rate of the cold water flowing through the cold water flow path 16 and the flow rate of the hot water flowing through the water flow path 18 is substantially constant during the use of a hand wash faucet (that is, during the discharge of water from the water discharge port 12).

When the temperature specifying unit 38 is not provided, the flow control unit 40 controls the opening/closing state of the first control valve 30 and the second control valve 32 so that the detection value of the temperature sensor 36 reaches a predetermined set temperature (fixed value).

Figure 2:
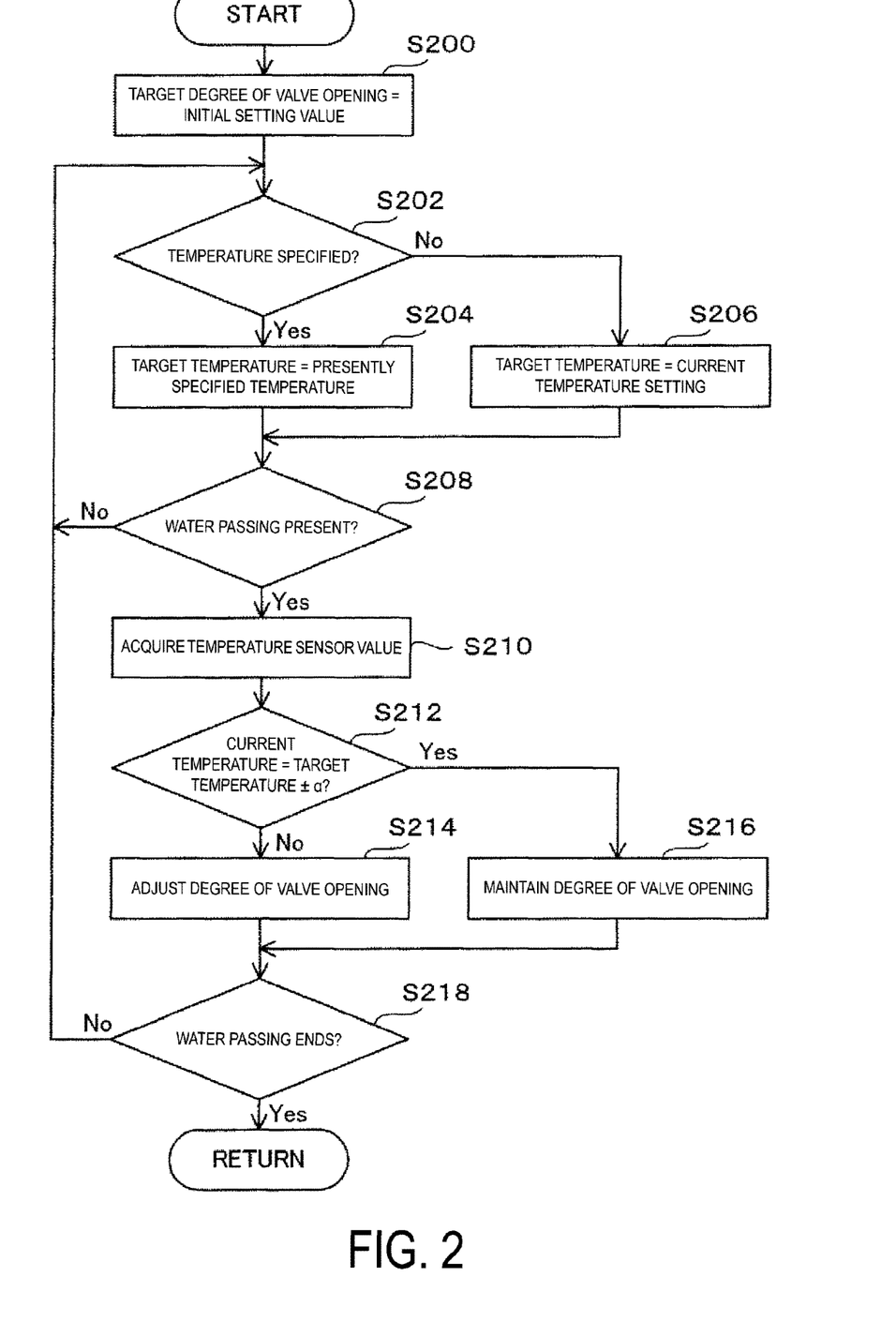
FIG. 2 is a flowchart illustrating processing of a flow control unit 40 in the first embodiment.

FIG. 2 is a flowchart illustrating processing of the flow control unit 40 in the first embodiment.

In an initial state, the target degree of valve opening of the first control valve 30 and the second control valve 32 are each set to a predetermined initial setting value (step S200).

When a temperature specifying operation (change in the specified water temperature or the like) is performed on the temperature specifying unit 38 (step S202: Yes), the flow control unit 40 sets the target temperature of the water to be discharged from the water discharge port 12 to the specified water temperature (the temperature presently specified for the temperature specifying unit 38) (step S204). Additionally, when the specifying operation is not performed on the temperature specifying unit 38 (step S202: No), the target temperature is maintained at the current temperature setting (step S206).

Until an operation (discharge ON operation) is performed on the discharge instruction unit 39 and passing of water is performed (step S208: No loop), the process returns to step S202 and the subsequent processing is continued.

When an operation (discharge ON operation) is performed on the discharge instruction unit 39, the flow control unit 40 opens the first control valve 30 and the second control valve 32 to the target degree of valve opening set in step S200, and starts passing water (step S208: Yes).

The flow control unit 40 acquires the detection value of the temperature sensor 36 (step S210), and determines whether the current water temperature (current temperature) in the mixing supply unit 26 is within the range of target temperature±α (α is a predetermined allowable value) (step S212).

When the current temperature is not in the range of target temperature±α (step S212: No), the flow control unit 40 changes the degrees of valve opening of the first control valve 30 and the second control valve 32 so that the water temperature in the mixing supply unit 26 approaches the target temperature (step S214). Specifically, for example, as described above, when the current temperature is higher than the target temperature, the first control valve 30 (the cold water side) is controlled to the opening direction and the second control valve 32 (the hot water side) is controlled to the closing direction. Further, for example, when the current temperature is lower than the target temperature, the first control valve 30 (the cold water side) is controlled to the closing direction, and the second control valve 32 (the hot water side) is controlled to the opening direction.

When the current temperature is in the range of the target temperature±α (step S212: Yes), the flow control unit 40 maintains the degrees of valve opening of the first control valve 30 and the second control valve 32 in the current state (step S216).

Until an operation (discharge OFF operation) is performed on the discharge instruction unit 39 and passing of water ends (step S218: No loop), the process returns to step S202 and the subsequent processing is continued. For example, when an operation of changing the specified water temperature is performed during the discharge of water, the target temperature is changed to the specified water temperature after change.

Then, when an operation (discharge OFF operation) is performed on the discharge instruction unit 39, the first control valve 30 and the second control valve 32 are fully closed to end passing of water (step S218: Yes), and the processing of this flowchart ends.

As described above, in the aircraft water supply system 10 according to the first embodiment, since the flow rate of cold water and hot water (the opening/closing state of the first control valve 30 and the second control valve 32) is controlled based on the water temperature detected by the temperature sensor 36, which is advantageous in controlling the temperature of the water to be discharged from the water discharge port 12 with high accuracy as compared with a case where the temperature sensor 36 is not used.

In addition, in the aircraft water supply system 10, since the temperature sensor 36 is provided in the mixing supply unit 26, it is possible to detect the temperature of the mixed water of cold water and hot water (that is, the temperature of water in a state near the water to be discharged from the water discharge port 12), which is advantageous in adjusting the water temperature to the desired water temperature with high accuracy.

Furthermore, the aircraft water supply system 10 controls the opening/closing state of the control valves 30 and 32 based on the temperature specified by the temperature specifying unit 38, which is advantageous in providing water at a temperature desired by the user.

Furthermore, the aircraft water supply system 10 uses a proportional control valve as the first control valve 30 and the second control valve 32, which is advantageous in adjusting the flow rates of cold water and hot water with high accuracy.

Second Embodiment

Figure 3:
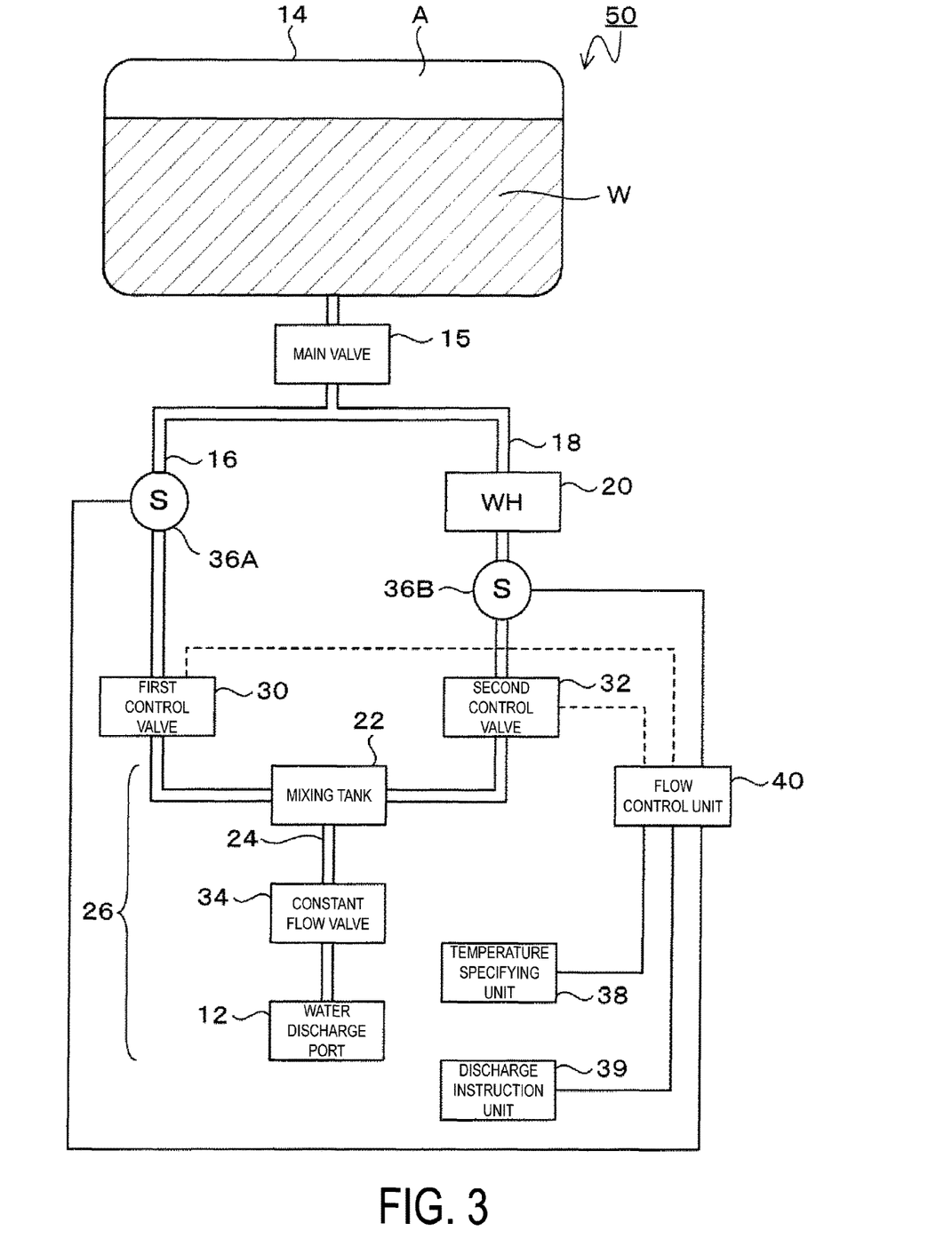
FIG. 3 is a diagram illustrating a configuration of an aircraft water supply system 50 according to a second embodiment.

In the first embodiment, the temperature sensor 36 is provided in the mixing supply unit 26. In the second embodiment, a case in which the temperature sensor 36 is provided in the cold water flow path 16 and the hot water flow path 18 will be described.

FIG. 3 is a diagram illustrating a configuration of an aircraft water supply system 50 according to a second embodiment.

In the configuration illustrated in FIG. 3, the same parts as those in FIG. 1 are denoted by the same reference signs, and detailed description thereof will be omitted.

In the aircraft water supply system 50 according to the second embodiment, the temperature sensors 36 (36A, 36B) are provided in the cold water flow path 16 and the hot water flow path 18, respectively. The temperature sensor provided in the cold water flow path 16 is referred to as a temperature sensor 36A, and a temperature sensor provided in the hot water flow path 18 is referred to as a temperature sensor 36B.

Note that in the example of FIG. 3, the temperature sensor 36A is provided in the water flow path 16 downstream from the water tank 14 and upstream from the first control valve 30, and the temperature sensor 36B is provided in the hot water flow path 18 at a location downstream from the water heater 20 and upstream from the second control valve 32.

The flow control unit 40 acquires the detection values of the temperature sensor 36A and the temperature sensor 36B, and controls the opening/closing state of the first control valve 30 and the second control valve 32 based on the temperature of the cold water flowing through the cold water flow path 16 and the temperature of the hot water flowing through the hot water flow path 18.

That is, the temperature of the mixed water when a plurality of components of water having different temperatures are mixed by a predetermined amount can be predicted with a certain accuracy. Thus, the flow control unit 40 controls the mixing ratio (≈the degree of valve opening) of the cold water and the hot water based on the temperatures of the cold water and the hot water acquired from the temperature sensors 36A and 36B so that the mixed water of cold water and hot water is at a target temperature.

Note that the flow control unit 40 may adjust the change in temperature of the cold water and hot water downstream from the temperature sensors 36A and 36B, for example, based on the thermal conductivity of the material of components (for example, the mixing tank 22 and the mixing flow path 24) downstream from the temperature sensors 36A and 36B or the temperature or the like around the components and control the opening/closing state of the first control valve 30 and the second control valve 32 by taking the predicted change in temperature into consideration.

Figure 4:
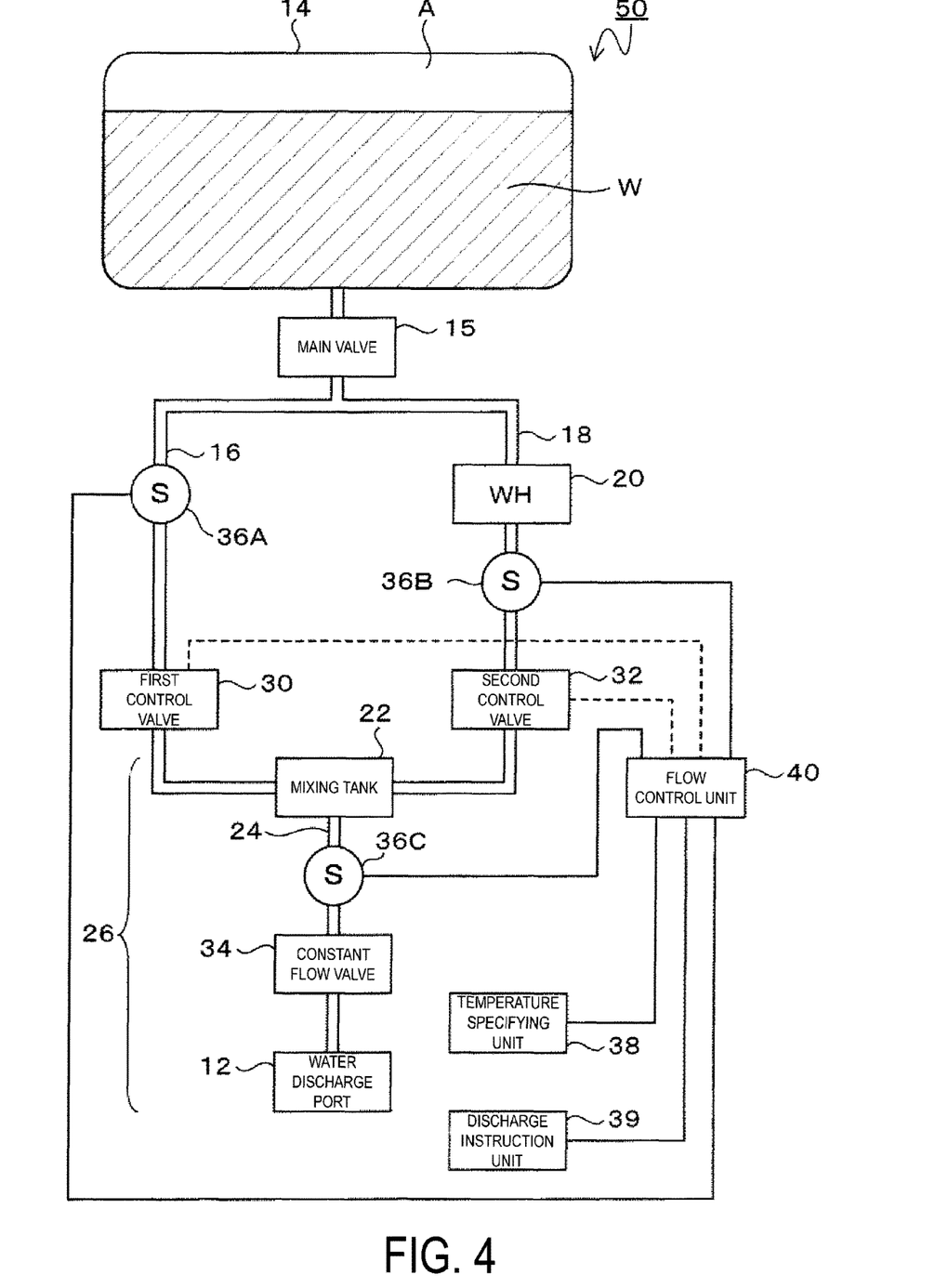
FIG. 4 is a diagram illustrating another configuration of an aircraft water supply system 50 according to the second embodiment.

Furthermore, as illustrated in FIG. 4 for example, a temperature sensor 36C may be provided in the mixing supply unit 26 in addition to the temperature sensors 36A and 36B. In this case, the flow control unit 40 controls the opening/closing state of the first control valve 30 and the second control valve 32 based on the temperature of the cold water flowing through the cold water flow path 16, the temperature of the hot water flowing through the hot water flow path 18, and the water temperature in the mixing supply unit 26.

For example, the flow control unit 40 determines a degree of valve opening changing direction based on the temperature of the mixed water acquired from the temperature sensor 36C so that the mixed water of cold water and hot water is at a target temperature. Furthermore, the flow control unit 40 determines the amount of change in the degree of valve opening based on the temperatures of the cold water and the hot water obtained from the temperature sensors 36A and 36B. Thus, for example, when the detection value of the temperature sensor 36C is higher than the target temperature, the flow control unit 40 determines that the first control valve 30 (the cold water side) is controlled to the opening direction and the second control valve 32 (the hot water side) is controlled to the closing direction. Specifically, how much the valve opening is to be changed is determined based on the temperatures of cold water and hot water acquired from the temperature sensors 36A and 36B.

In this way, by using three temperature sensors 36, the temperature of the water discharged from the water discharge port 12 can be brought closer to the target temperature with higher accuracy.

Figure 5:
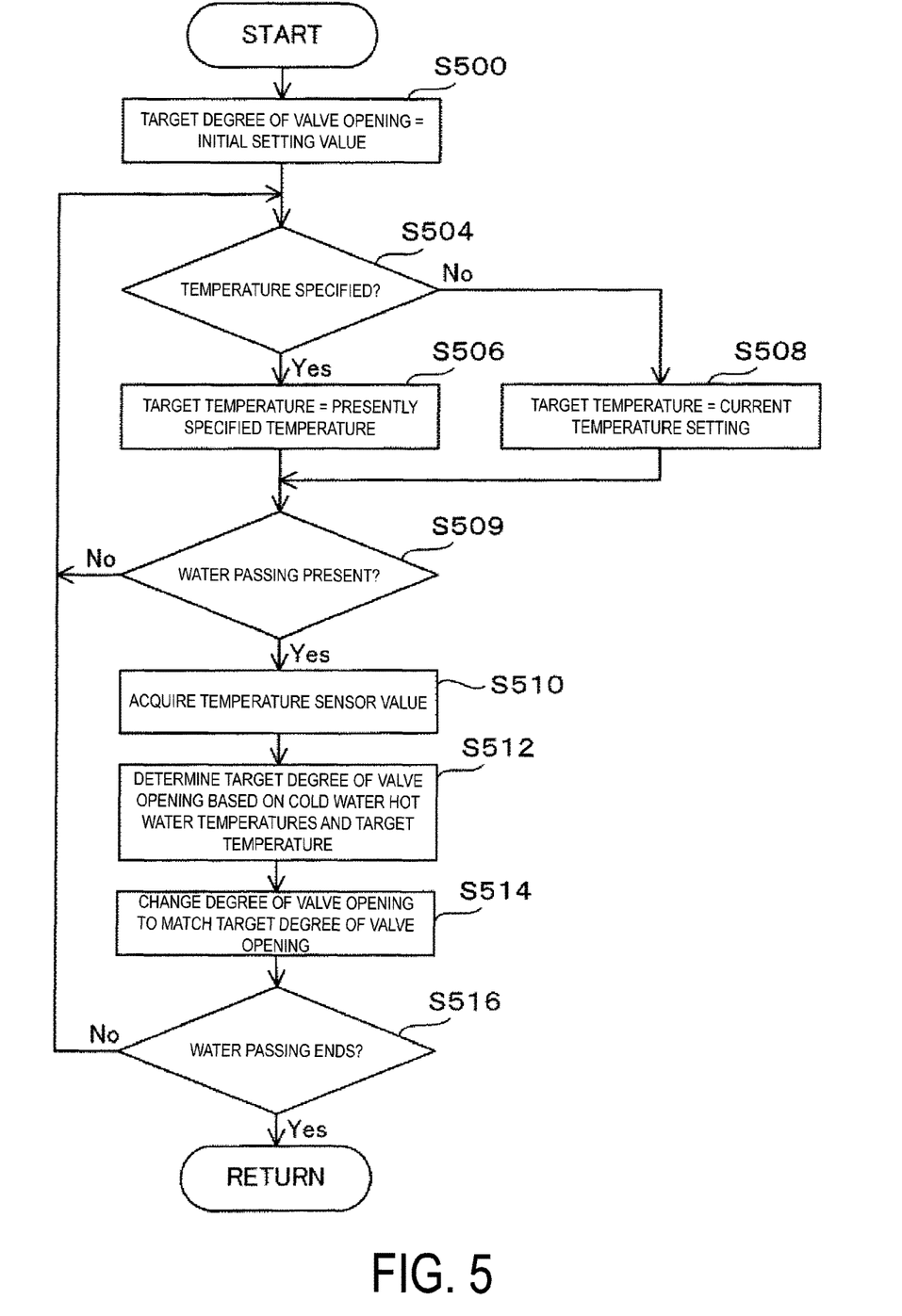
FIG. 5 is a flowchart illustrating processing of the flow control unit 40 in the second embodiment.

FIG. 5 is a flowchart illustrating processing of the flow control unit 40 in the second embodiment (the case of the configuration illustrated in FIG. 3).

In an initial state, the target degrees of valve opening of the first control valve 30 and the second control valve 32 are each set to a predetermined initial setting value (step S500).

When a temperature specifying operation (change in the specified water temperature or the like) is performed on the temperature specifying unit 38 (step S504: Yes), the flow control unit 40 sets the target temperature of the water to be discharged from the water discharge port 12 to the specified water temperature (the temperature presently specified for the temperature specifying unit 38) (step S506). Additionally, when the specifying operation is not performed on the temperature specifying unit 38 (step S504: No), the target temperature is maintained at the current temperature setting (step S508).

Until an operation (discharge ON operation) is performed on the discharge instruction unit 39 and passing of water is performed (step S509: No loop), the process returns to step S504 and the subsequent processing is continued.

When an operation (discharge ON operation) is performed on the discharge instruction unit 39, the flow control unit 40 opens the first control valve 30 and the second control valve 32 to the target degrees of valve opening set in step S200, and starts passing water (step S509: Yes).

The flow control unit 40 acquires the detection values of the temperature sensors 36A and 36B (step S510), and determines the target degrees of valve opening of the first control valve 30 and the second control valve 32 based on the cold water temperature and the hot water temperature acquired from the temperature sensors 36A and 36B, and the target temperature (step S512). Specifically, the mixing ratio of cold water and hot water is calculated such that the mixed water of cold water and hot water is at a target temperature, and the degree of valve opening is calculated such that cold water and hot water flowing on the mixing supply unit 26 side have the mixing ratio.

Then, the degrees of valve opening of the first control valve 30 and the second control valve 32 are changed to match the target degrees of valve opening (step S514).

Until an operation (discharge OFF operation) is performed on the discharge instruction unit 39 and passing of water ends (step S516: No loop), the process returns to step S504 and the subsequent processing is continued. For example, when an operation of changing the specified water temperature is performed during the discharge of water, the target temperature is changed to the specified water temperature after change.

Then, when an operation (discharge OFF operation) is performed on the discharge instruction unit 39, the first control valve 30 and the second control valve 32 are fully closed to end passing of water (step S516: Yes), and the processing of this flowchart ends.

As described above, according to the aircraft water supply system 50 according to the second embodiment, the following effects can be obtained in addition to the effects of the first embodiment.

In other words, in the aircraft water supply system 50, the temperature sensors 36A and 36B are provided in the cold water flow path 16 and the hot water flow path 18, respectively, which is advantageous in adjusting the mixing ratio at the stage of mixing cold water and hot water and adjusting the temperature of the water to be discharged from the water discharge port 12 to a desired water temperature.

In addition, the temperature sensors 36A, 36B, and 36C are provided in the mixing supply unit 26 as well as in the cold water flow path 16 and the hot water flow path 18 as illustrated in FIG. 4, which is advantageous in adjusting the temperature of the water to be discharged from the water discharge port 12 with higher accuracy.

The invention claimed is:

1. An aircraft water supply system for supplying water to a water discharge port in an aircraft, the system comprising:
   a cold water flow path that supplies cold water to the water discharge port;
   a hot water flow path that supplies hot water to the water discharge port;
   a first control valve that adjusts a flow rate of the cold water flowing through the cold water flow path;
   a second control valve that adjusts a flow rate of the hot water flowing through the hot water flow path;
   a temperature sensor that detects a water temperature at any point up to the water discharge port;
   a flow control unit that controls an opening/closing state of the first control valve and the second control valve based on the water temperature detected by the temperature sensor;
   a mixing tank that mixes the cold water and the hot water downstream from the first control valve and the second control valve and supplies mixed water to the water discharge port, wherein
   the temperature sensor is in the mixing tank, and
   the flow control unit controls the opening/closing state of the first control valve and the second control valve based on the water temperature in the mixing tank.

2. The aircraft water supply system according to claim 1, wherein
   the cold water flow path and the hot water flow path each comprise a flow path temperature sensor, and
   the flow control unit controls the opening/closing state of the first control valve and the second control valve based on a temperature of the cold water flowing through the cold water flow path and a temperature of the hot water flowing through the hot water flow path.

3. The aircraft water supply system according to claim 2, wherein the flow control unit predicts a change in temperature of the cold water and the hot water downstream from the temperature sensor based on at least one of a thermal conductivity of a component downstream from the temperature sensor or a temperature around the component, and controls the opening/closing state of the first control valve and the second control valve by taking the change in temperature into consideration.

4. The aircraft water supply system according to claim 3, wherein the flow control unit controls the opening/closing state of the first control valve and the second control valve so that a sum of the flow rate of the cold water flowing through the cold water flow path and the flow rate of the hot water flowing through the hot water flow path is maintained during discharge of water from the water discharge port.

5. The aircraft water supply system according to claim 4, wherein the first control valve and the second control valve are proportional control valves, whose degree of openings can be adjusted as desired.

6. The aircraft water supply system according to claim 1, further comprising a temperature specifying unit that allows a user to specify a temperature of the water to be discharged from the water discharge port, wherein the flow control unit controls the opening/closing state of the first control valve and the second control valve based on the temperature specified by the temperature specifying unit.

7. The aircraft water supply system according to claim 1, wherein the flow control unit controls the opening/closing state of the first control valve and the second control valve so that a sum of the flow rate of the cold water flowing through the cold water flow path and the flow rate of the hot water flowing through the hot water flow path is maintained during discharge of water from the water discharge port.

8. The aircraft water supply system according to claim 1, wherein the first control valve and the second control valve are proportional control valves, whose degree of openings can be adjusted as desired.

9. The aircraft water supply system according to claim 1, further comprising a constant flow valve downstream from the mixing tank and upstream from the water discharge port, the constant flow valve being configured to make an amount of water supplied to the water discharge port constant by widening or narrowing a water channel depending on an upstream water pressure.

* * * * *